(12) United States Patent
Lin

(10) Patent No.: US 7,191,171 B2
(45) Date of Patent: Mar. 13, 2007

(54) DATA REPRESENTATION AND RETRIEVAL METHOD AND APPARATUS FOR HIGH SPEED DATA SEARCH AND RETRIEVAL

(75) Inventor: Chihlung Lin, Cerritos, CA (US)

(73) Assignee: Alpine Electronics, Inc., Tokyo (JP)

( * ) Notice: Subject to any disclaimer, the term of this patent is extended or adjusted under 35 U.S.C. 154(b) by 464 days.

(21) Appl. No.: 10/735,085

(22) Filed: Dec. 12, 2003

(65) Prior Publication Data

US 2005/0131864 A1    Jun. 16, 2005

(51) Int. Cl.
    *G06F 7/10*    (2006.01)
(52) U.S. Cl. .................. 707/2; 707/1; 707/3; 707/4; 707/10
(58) Field of Classification Search .............. 707/3, 707/102, 1, 2, 4, 10
    See application file for complete search history.

(56) References Cited

U.S. PATENT DOCUMENTS

| | | | |
|---|---|---|---|
| 3,670,310 A * | 6/1972 | Bharwani et al. ............. 707/3 |
| 5,613,110 A * | 3/1997 | Stuart ............................ 707/1 |
| 5,920,541 A * | 7/1999 | Sasaki et al. ............. 369/275.3 |
| 2002/0067377 A1 | 6/2002 | McGovern | |
| 2003/0233618 A1* | 12/2003 | Wan ........................... 715/513 |

* cited by examiner

*Primary Examiner*—Hung Pham
(74) *Attorney, Agent, or Firm*—Muramatsu & Associates (57) ABSTRACT

A data representation and retrieval method and apparatus enables to quickly locate and extract specified data from a data file with use of supplemental data stored in a small storage file. The method includes the steps of providing a primary data file which stores a large volume of recorded data where a location of each piece of recorded data is represented by an offset value, providing a secondary data file which stores supplemental data for assisting to search and retrieve the recorded data from the primary data file, accessing the secondary data file to retrieve supplemental data corresponding to search data specified by a user, and accessing the primary data file at locations specified by offset values derived from the supplemental data and retrieving the recorded data therefrom.

18 Claims, 8 Drawing Sheets

Fig. 1A

```
            MENU
    ┌─────────────────────┐
    │    Destination      │
    │    Set Up           │
    │    Option           │
    │    Route            │
    └─────────────────────┘
```

Fig. 1B

| Dest | Find Destination by |
|------|---------------------|
| Address |                  |
| Intersection |             |
| Point of Interest |        |
| Map Cursor |               |
| Recent Route |             |
| Address Book |             |

Fig. 1C

| Dest | Input Address |
|------|---------------|

CA-11 _

| A B C D E F G H I J | Delete |
| K L M N O P Q R S T |        |
| U V W X Y Z & ' / - | Space  |
| 1 2 3 4 5 6 7 8 9 0 |        |

| Dest | Input Place Name |
|------|------------------|

CA-110 _

| A B C D E F G H I J | Delete |
| K L M N O P Q R S T |        |
| U V W X Y Z & ' / - | Space  |
| 1 2 3 4 5 6 7 8 9 0 |        |

CONFIRM ROUTE

CA-1101 St.
Torrance, CA

By Quickest Route Method
OK to Proceed
Options

Fig. 1F

NEXT TURN: ← 0.8 MI
PRAIRIE AVE.

VP    NP

1/8mi

TO    16 MI    0:15 TO GO
ON: W. 190TH ST., TORRANCE

Name and Address File

62

| Offset | Records |
|---|---|
| ⋮ | ⋮ |
| 200 | CA - 112 |
| 210 | CA - 113 |
| 220 | CA - 114 |
| 230 | CA - 115 |
| ⋮ | ⋮ |
| 340 | CA - 201 |
| 350 | CA - 202 |
| 360 | CA - 203 |
| ⋮ | ⋮ |
| 5010 | CA - 1101 |
| 5020 | CA - 1102 |
| 5030 | CA - 2101 |
| ⋮ | ⋮ |

Fig. 4B

Search and Skip File:

64

⋮

CA - 11
  Remaining Count: 6
  Offset: 200, 210, 220
         230, 5010, 5020

CA - 12
  Remaining Count: 3
  Offset: 550, 560, 570

CA - 13
  Remaining Count: 5
  Offset: 180, 300, 1000
         3030, 3040

Name and Address File

— 62

| Offset | Related Records |
|---|---|
| ⋮ | ⋮ |
| 100 | SecNameRec 0 |
| ⋮ | ⋮ |
| 250 | SecNameRec 1 |
| 260 | SecNameRec 2 |
| 270 | SecNameRec 3 |
| ⋮ | ⋮ |
| 600 | SecNameRec 4 |
| 610 | SecNameRec 5 |
| ⋮ | ⋮ |

Fig. 5B

Search and Skip File

— 164

Search Data
  uiRemainingCnt: 6
  uiNameOffset: 100
  usDelta[ ]:

| MSB | Value |
|---|---|
| 0 | 15 |
| 1 | 2 |
| 0 | 33 |
| 0 | 1 |

Fig. 6A

Name and Address File

62

| Offset | Records |
|---|---|
| ⋮ | ⋮ |
| 200 | CA - 112 |
| 210 | CA - 113 |
| 220 | CA - 114 |
| 230 | CA - 115 |
| ⋮ | ⋮ |
| 340 | CA - 201 |
| 350 | CA - 202 |
| 360 | CA - 203 |
| ⋮ | ⋮ |
| 5010 | CA - 1101 |
| 5020 | CA - 1102 |
| 5030 | CA - 2101 |
| ⋮ | ⋮ |

Fig. 6B

Search and Skip File

164

⋮

CA - 11
  uiRemainingCnt: 6
  uiNameOffset: 200
  usDelta[ ]:

| MSB | Value |
|---|---|
| 1 | 3 |
| 0 | 478 |
| 1 | 1 |

CA - 12
  uiRemainingCnt: 3
  uiNameOffset: 550
  usDelta[ ]:

| MSB | Value |
|---|---|
| 1 | 2 |

CA - 13
  uiRemainingCnt: 5
  uiNameOffset: 180
  usDelta[ ]:

| MSB | Value |
|---|---|
| ⋮ | |

Fig. 7

DATA REPRESENTATION AND RETRIEVAL METHOD AND APPARATUS FOR HIGH SPEED DATA SEARCH AND RETRIEVAL

FIELD OF THE INVENTION

This invention relates to a data retrieval method and apparatus for efficiently retrieving specified data from a data storage that stores a large volume of data, and more particularly, to a data representation, data storing and data retrieval method and apparatus for quickly accessing the data storage and retrieving the recorded data by using supplemental data that indicates locations of the recorded data, whether the recorded data are located consecutively, the number of consecutively recorded data, and the like.

BACKGROUND OF THE INVENTION

The present invention is advantageously applicable to a data retrieval process and apparatus such as in a process for retrieving place name data or address data from a large capacity map data storage for a navigation system. Although the application of the present invention is not limited to a navigation system, the present invention is described mainly with respect to the navigation system for convenience of explanation.

A navigation system, typically, a vehicle navigation system, performs travel guidance for enabling a user to easily reach a selected destination. Such a navigation system detects the position of the vehicle, reads out map data pertaining to an area at the vehicle current position from a data storage medium, for example, a CD-ROM (compact disk read-only memory) or a DVD (digital versatile disc). Typically, the vehicle position is determined by a self-contained navigation sensors (e.g. a distance traveled sensor and a bearing sensor) mounted in the vehicle and by a global positioning system (GPS) including a satellite (satellite navigation).

Figure 1A:
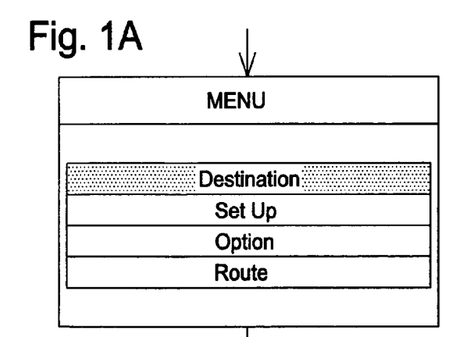
FIGS. 1A–1F are schematic diagrams showing an example of operational process and screen display involved in the navigation system for selecting a destination through data retrieval from a data storage.
Figure 1B:
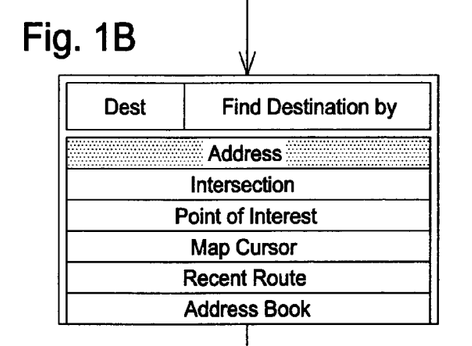

FIGS. 1A–1F show an example of overall procedure and screen display involved in the navigation system. FIGS. 1A–1D show an example of process for specifying a destination in the navigation system. When selecting a "Destination" menu on a main menu screen of FIG. 1A, the navigation system displays an "Find Destination By" screen as shown in FIG. 1B for specifying an input method for selecting the destination. The "Find Destination By" screen lists various methods for selecting the destination, which include "Address", "Intersection", "Point of Interest (POI)", "Recent Route", "Address Book", and "Today's Plan".

Figure 1C:
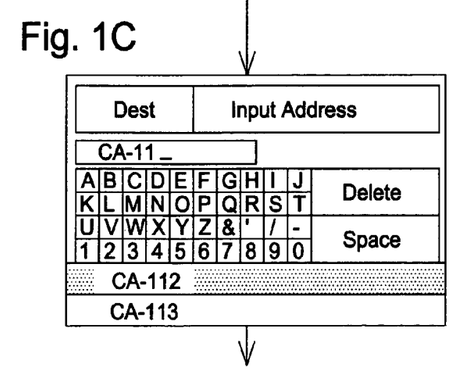

When selecting the "Address" method in FIG. 1B, the navigation system displays a keyboard screen as shown in FIG. 1C. Suppose the user inputs an address or a place name of the destination, the navigation system searches candidate destinations without waiting for full information is input by the user. For example, in FIG. 1C, when the user inputs "CA-11", the navigation system retrieves address data that start with "CA-11", such as "CA-112" and "CA-113", although "CA-11" is only a part of the address.

Figure 1D:
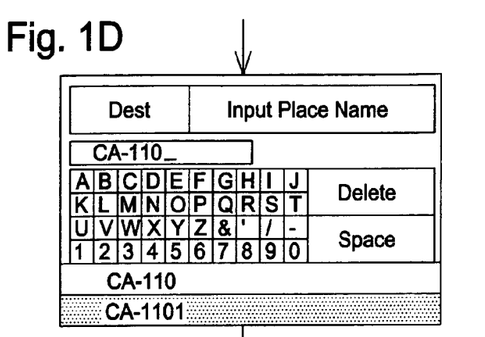
Figure 1E:
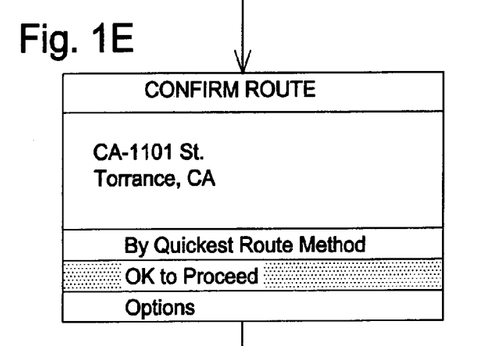

When the retrieved data do not match the destination intended by the user, he inputs further digits of address as shown in FIG. 1D. Thus, in this example, the user inputs "CA-110", then the navigation system retrieves addresses of the candidate destinations "CA-110" and "CA-1101". Suppose the address "CA-1101" is the address of the destination where the user wants to go, he selects this address. The navigation system displays a "Confirm Destination" screen such as shown in FIG. 1E. If the name and address on the screen shows the correct destination, the user enters an "OK to Proceed" key to proceed to the next procedure.

Figure 1F:
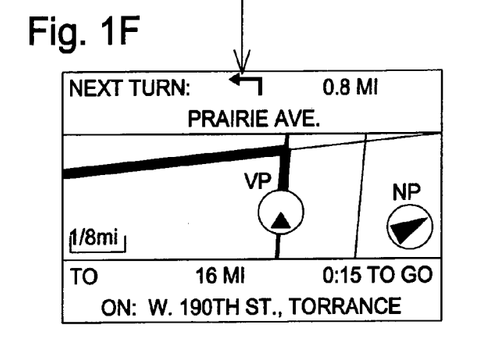

The navigation system calculates and determines a route to the destination. Once the route to the destination is determined, the navigation system starts the route guidance as shown in FIG. 1F for guiding the user to the destination. Typically, the navigation system shows an intersection that is highlighted on the display to show the next turn and a direction of the turn. When the user approaches the destination within such a predetermined distance, the navigation system indicates that the destination is ahead.

During the process in which the user inputs an address of the destination, the navigation system predicts the full address to be input without waiting for the full data by the user. This is because by examining its database, the navigation system can tell that there are certain numbers of candidate address that would fit the input by the user so far. For example, in the case where the user is trying to input the street address of "CA-1101", and has already input "CA-11" as shown in FIG. 1C, there are certain numbers of candidates that would be consistent with the input.

Figure 2:
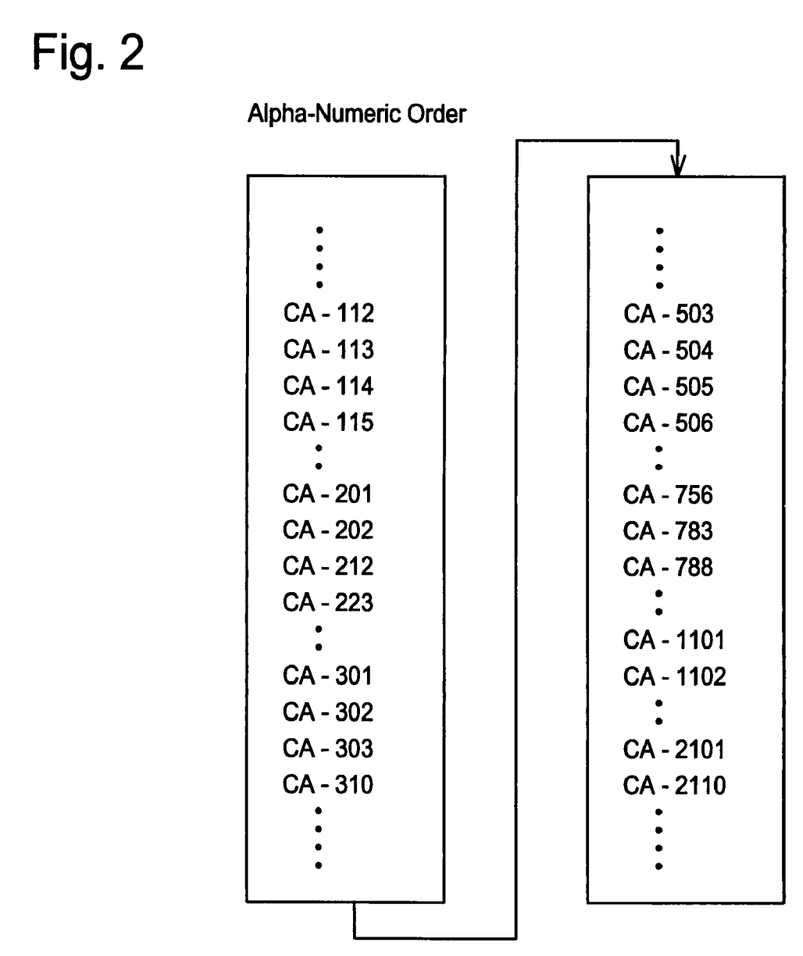
FIG. 2 is an example of name and address data arranged in a data storage by an alpha-numeric order to be searched by a navigation system.

FIG. 2 shows an example of data stored in a data storage where the data is arranged in an alpha-numeric order. In this case, there are six (6) possible entries that can follow from the user's input "CA-11". Namely, all of addresses "CA-112", "CA-113", "CA-114", "CA-115", "CA-1101" and "CA-1102" start with the specified input (search data) "CA-11". In the data arrangement of the alpha-numeric order, the data is stored in the alphabetical as well as numerical order as shown in FIG. 2. Thus, the above noted six entries (recorded data) will be extracted by sequentially checking all of the entries of the data in the storage.

Namely, in the data arrangement of FIG. 2, there are a large volume of data that has to be searched before finding the first possible entry "CA-112". Further, between the possible entry "CA-115" and the next possible entry "CA-1101" there are a large number of data entries which have to be checked. Therefore, it takes a long time to search and check the possible entries by a data retrieval system. It is especially true when the volume of data is large, such as several million entries in an address data file used in a typical navigation system.

More specifically, the dots between the entries indicates that there are other recorded data. In the example of FIG. 2, the address records ranging from "CA-112" to "CA-2101" are shown. After "CA-115", the records that have numbers higher than "CA-115" are arranged so that such records as "CA-212" will follow. In order to accomplish the above function, the navigation system must be able to quickly search available address records as the user inputs a string of characters.

Because the address records are arranged in the alphanumeric order as noted above, the number "1101" comes long after the number "115". As shown in FIG. 2, after the record "CA-115", many records exist until the record "CA-1101" is reached. There may be several ten or hundred thousands of records to be searched in order to find all records that would fit the description. If the navigation system is going to check all the records to determine the number and records, it takes a long time to find all the desired records. The search time will directly reflect on the response time of the input display.

SUMMARY OF THE INVENTION

It is, therefore, an object of the present invention to provide a data representation and retrieval method and apparatus which is able to efficiently retrieve one or more candidates of data from a data storage.

It is another object of the present invention to provide data representation, data storing and data retrieval method and apparatus which is able to store supplemental data with use of a relatively small storage space for efficiently retrieving the data from a large data storage.

It is a further object of the present invention to provide a data representation and retrieval method and apparatus in which two or more pieces of data having a specified character string are retrieved from a primary data file with use of supplemental data from a secondary data file when the data in the primary data file is arranged in an alpha-numeric order.

In the present invention, the data representation and retrieval method correlates a particular input string (search data) and its associated record locations by two sets of data file. Namely, the method makes use of supplemental data that indicates locations of the recorded data, whether or not the recorded data to be retrieved are located consecutively, the number of consecutively recorded data, and if the recorded data are not consecutive, a distance between the next recorded data to be retrieved.

The data representation and retrieval method is comprised of the steps of: providing a primary data file which stores a large volume of recorded data where a location of each piece of recorded data is represented by an offset value; providing a secondary data file which stores supplemental data for assisting to search and retrieve the recorded data from the primary data file; accessing the secondary data file to retrieve supplemental data corresponding to search data specified by a user; and accessing the primary data file at locations specified by offset values derived from the supplemental data and retrieving the recorded data therefrom.

In the data representation and retrieval method of the present invention, the supplemental data for each search data in the secondary data file includes a number of counts of the recorded data carrying the search data, and offset values showing locations of the recorded data carrying the search data in the primary data file.

In another aspect of the present invention, the supplemental data for each search data in the secondary data file includes a number of counts of the recorded data carrying the search data, and a first offset value showing a first location of the recorded data carrying the search data in the primary data file, and flag data showing whether or not the recorded data carrying the search data are consecutively located in the primary data file. The flag data further shows a number of consecutive locations when the recorded data carrying the search data are consecutively located in the primary data file, and a difference of offset values between the current location of the recorded data and the next recorded data in the primary data file.

The recorded data in the primary data file are arranged in an alpha-numeric order. The search data is a string of alphabetical and numeral characters, and the supplemental data for each search data is established in advance in the secondary data file. The offset value is described by four-byte data and the flag data is described by two-byte data. The most significant bit of the two-byte data shows whether or not the recorded data carrying the search data are consecutively located in the primary data file.

In the data representation and retrieval method of the present invention, the step of accessing the primary data file includes a step of generating offset data based on the supplemental data from the secondary data file for accessing and retrieving the recorded data from the primary data file.

Further, the step of generating the offset data includes a step of consecutively incrementing the offset data by a minimum incrementing step or jumping a difference of offset values based on the supplemental data.

A further aspect of the present invention is a data representation and retrieval apparatus for implementing the various steps defined in the method noted above. The data representation and retrieval apparatus includes the primary data file and the secondary data file noted above as well as various means to quickly locate the recorded data in the primary data file with use of the supplemental data stored in the secondary data file.

BRIEF DESCRIPTION OF THE DRAWINGS

FIGS. 4A–4B show an example of data files for use in the present invention in which

FIGS. 5A–5B show an example of data files in the present invention in which

FIGS. 6A–6B show an example of data files corresponding to the example of FIGS. 4A and 4B in which

FIGS. 8A–8B are schematic views of data structure in which

DETAILED DESCRIPTION OF THE INVENTION

The data presentation, storing and retrieval method and apparatus of the present invention will now be described in detail with reference to the accompanied drawings. The present invention is advantageously applicable to a navigation system in a data retrieval process and apparatus for retrieving, for example, address data from a large capacity map data storage. Although the application of the present invention is not limited to the navigation system, the present invention is described in the following mainly with respect to the navigation system for convenience of explanation.

Figure 3:
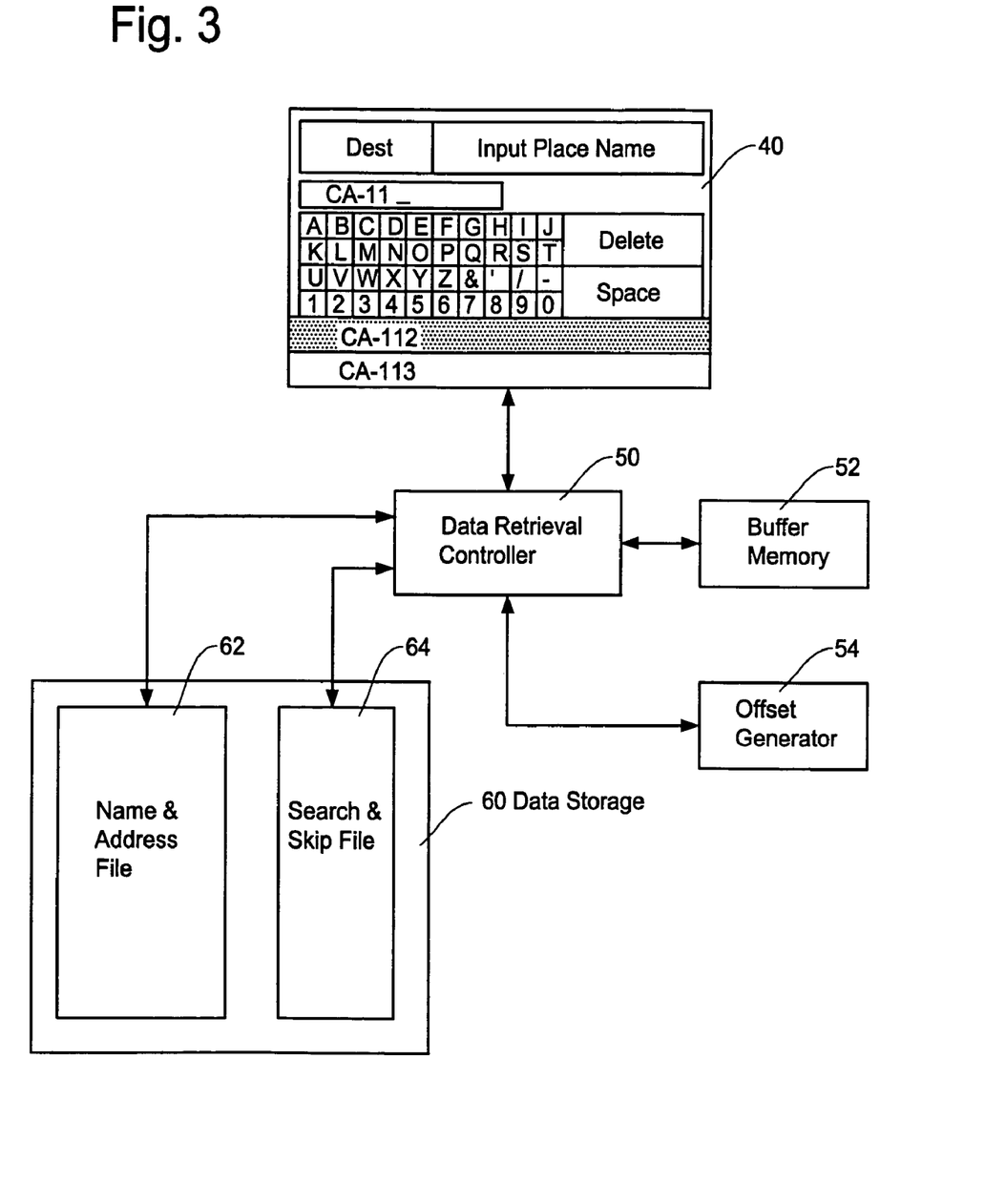
FIG. 3 is a schematic block diagram showing a basic structure of the data storing and retrieval apparatus in accordance with the present invention.

The basic configuration of the representation and retrieval method and apparatus of the present invention is shown in FIG. 3 which can be a part of a navigation system. In this example, the data representation and retrieval apparatus includes a display 40 with a keyboard, a data retrieval controller 50, a buffer memory 52, an offset (address data) generator 54, a data storage 60 configured by a primary data file (ex. name and address file) 62 and a secondary data file (ex. search and skip file) 64.

In an application of navigation system, the data retrieval controller 50 is typically a central processing unit (CPU) of the navigation system, and the display 40 is a monitor screen of the navigation system to show the guided route to the destination, keyboard, etc. The offset generator 54 generates offset data (address data) showing the locations of the recorded data in the data storage 60 to be retrieved. Typically, the offset generator 54 is configured by a program counter which counts a reference clock in the navigation system to increment the offset data by a predetermined step such as "1" or "10".

When the user inputs search data such as an address of a destination in the application of the navigation system, the data representation and retrieval apparatus (navigation system) starts searching the address data from the data storage 60. Such a search operation starts even when only a part (ex. "CA-11") of the full address (ex. "CA-1101") is specified on the display 40 (keyboard) by the user. When the partial search data such as "CA-11" is input by the user, the data retrieval controller 50 accesses the data storage 60 to retrieve the records of address information having the search data "CA-11" at the tops.

In the present invention, the data storage 60 is, for example a DVD, and as noted above, configured by two files; a primary data file (name and address file) 62 storing a large volume of data entries (records) in an alpha-numeric order, and a secondary data file (search and skip file) 64 storing supplemental data for efficiently searching the data in the name and address file 62. When the search data is specified, the data retrieval controller 50 accesses the search and skip file 64 to retrieve the supplemental data therein. The supplemental data may be temporarily stored in the buffer memory 52 so that the data retrieval controller 50 can use the supplemental data in the buffer memory 52 which operates much faster than the data storage 60.

The supplemental data includes offset values each showing a position of recorded data (ex. address information) to be retrieved in the data storage 60. Based on the offset value, the data retrieval controller 50 instructs the offset generator 54 to generate the offset data indicating the position of the recorded data (ex. address of the destination in the case of navigation system) in the name and address file 62. The data retrieval controller 50 sends the offset data from the offset generator 54 to access the locations in the name and address file 62 and retrieves the recorded data (ex. address of destination) having the specified character string (series of alphabetic and numeral characters) from the search and skip file 62.

Figure 4A:
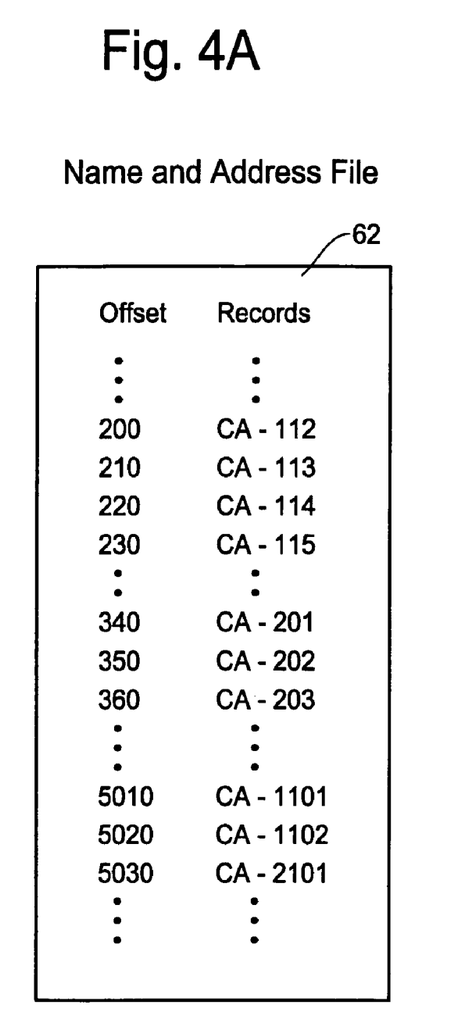
FIG. 4A shows a name and address file which stores name and address data in an alphanumeric order and FIG. 4B shows a search and skip file which stores supplemental data for efficiently searching and retrieving the data from the name and address file of FIG. 4A.
Figure 4B:
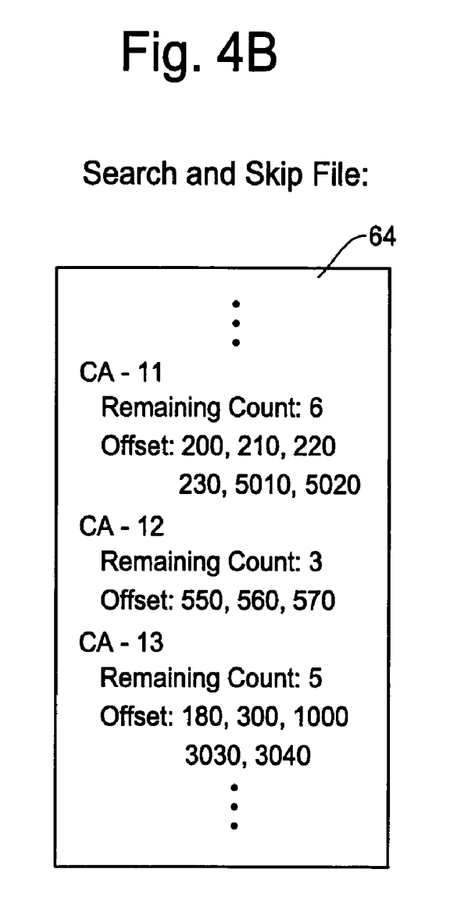

FIG. 4A is the name and address file (primary data file) 62 showing offset values (equivalent to addresses of the file 62) of the corresponding records. The offset values in this example are sequentially assigned at every "10" step. FIG. 4B is the search and skip file (secondary data file) 64 showing the number of records (recorded data) to be found in the primary data file 62 and offset values of the target records for each search input (character string). Namely, in the present invention, in addition to the primary data file (name and address file) 62 of FIG. 4A, the secondary data file (search and skip file) 64 of FIG. 4B that is prepared in advance is used for checking the supplemental data such as a number of records and locations of the records in the name and address file 62.

For example, for the input search data "CA-11", the name and address file 62 of FIG. 4A stores six records that begin with the same character string (search data "CA-11"). For example, the search data in the search and skip file 64 are so arranged that the maximum number of records for each search data will not exceed a predetermined number, such as ten (10). The data showing the offset data (locations) of the six records carrying the search data "CA-11" in the name and address file 62 is stored in the search and skip file 64. The offset data shows locations (addresses) in the name and address file 62 in which the address records having the search data "CA-11" at the beginning are stored. Similarly, as shown in FIG. 4B, the data showing the number of records and their offset values (locations) of the records that start with the next possible search data "CA-12", "CA-13" . . . , are stored in the search and skip file 64.

Thus, when the user inputs "CA-11" for example, the data retrieval controller (ex. a CPU in the navigation system) 50 first accesses the data in the search and skip file 64 to see which locations (offset values) of the name and address file 62 store the records that start with the search data "CA-11". In this example, the supplemental data from the search and skip file 64 indicates that there are six records that start with "CA-11" and the offset value (memory address) of each record in the name and address file 62. The data retrieval controller 50 instructs the offset generator 54 to increment the offset data.

The offset generator 54 continuously increments the offset data at every ten step by, for example, counting the number of clocks. If necessary, based on the offset value, the offset generator 54 produces offset data that jump to the next location of the name and address file 62. Every time when the offset data reaches the offset value from the search and skip file 64 such as 200, 210, 220, . . . , the data retrieval controller 50 retrieves the recorded data in the location specified by the offset data in the name and address file 62.

Thus, the data retrieval controller 50 is able to quickly go to the locations where the specified data are stored in the name and address file 62, rather than checking each and every location of the name and address file 62. Consequently, the time required for retrieving the recorded data, such as the records start with "CA-11" noted above, is dramatically reduced. In other words, this arrangement will solve the search time delay problem associated in the above example of FIG. 2 because the data retrieval controller 50 needs not search and read one by one from the initial offset location until all target data are found.

However, the embodiment of FIGS. 4A–4B still needs improvement because the search and skip file 64 needs a relatively large storage space. For instance, in the typical implementation of the embodiment of FIGS. 4A and 4B, each offset value takes 32bits (4bytes). Thus, 40bytes of data storage space is required to store the offset value of up to ten (10) records. Further, since the offset generator 54 has to consecutively increment the offset data, it takes time to increment the offset data from one desired offset data to another offset data when there is a large difference therebetween.

Figure 5A:
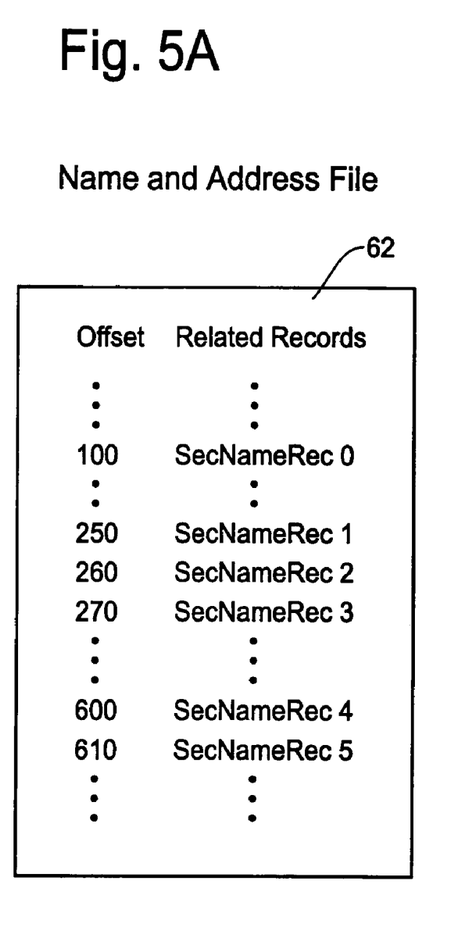
FIG. 5A is the name record file showing offset values and corresponding records.
Figure 5B:
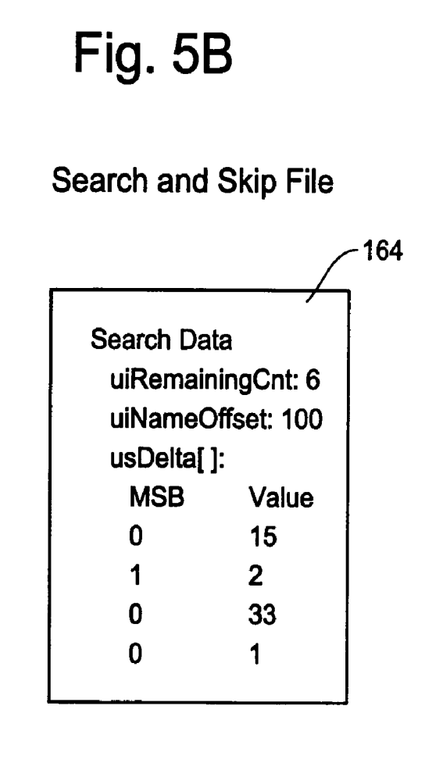
FIG. 5B is the search and skip file showing the number of records to be found and delta data that represent the offset values of the target records.

FIGS. 5A and 5B are schematic diagrams showing an improved version of the data representation and retrieval method and apparatus of the present invention. The basic structure of the data storage 60 is the same as that shown in FIG. 3 where there are primarily two files 62 and 164 in the data storage 60 such as DVD. The name and address file 62 is a database which stores a large volume of data such as, in the application of navigation system, street addresses, place names, points of interest, etc. Thus, the name and address file 62 is the same as that shown in FIG. 4A. The search and skip file 164 stores the supplemental data similar to the example of FIG. 4B, however, the manner of representing the supplemental data are different from that of the search and skip file of FIG. 4B.

In the name and address file 62, the number at the left side of each row is an offset value which indicates a position (address) of the recorded data. Typically, the offset value indicates a distance from a start point of the name and address file 62. In this example, the difference between the two adjacent offset values is ten (10). The right side of each row indicates recorded data such as a street name and number, a place name, or a type of points of interest in the application of navigation system. In this example, each recorded data is assigned with ten (10) bytes of data storage. Thus, as noted above, the offset value differs by 10 from the adjacent offset values such as between SecNameRec 1 to SecNameRec 2 in FIG. 5A.

An example of the supplemental data in the search and skip file 164 is shown in FIG. 5B. The search and skip file 164 stores a remaining count, an offset value, and a delta data value. In this example, an affix "ui" at the beginning of the data indicates unsigned integer and affix "us" indicates unsigned short as conventionally used in a computer industry. Thus, the label "uiRemainingCnt" indicates the number (ex. 6) of records in the name and address file 62 having the same search data. The label "uiNameOffset" indicates the offset value of the first recorded data in the name and address file 62 carrying the search data. Namely, the offset value 100 specifies the location (offset value: 100) of the first recorded data "SecNameRec 0" carrying the search data in the name and address file 62 of FIG. 5A.

The delta data value is a two byte word (16 bits) which is divided into an MSB (most significant bit) part and a value part. The most significant bit (MSB) indicates whether there is consecutive recorded data having the same search data when two or more remaining counts of recorded data is indicated by "uiRemainingCnt". The MSB data value is a flag that indicates whether a particular condition is true or not. The MSB has two states, "1" indicates that consecutive data exist in the name and address file 62 and the other, "0" indicates that no consecutive data exists.

The delta value (value part by 15bits) following the MSB indicates the number of consecutive records following the particular record, i.e, a distance or an amount of jump, to the next location of the recorded data. As will be explained in detail later, the value part of the delta changes its characteristics based on the MSB. In this example, if the MSB value is 0, i.e., there is no consecutive recorded data, and the delta value indicates the distance (jump value) to the next recorded data. If the MSB value is 1, i.e., there are consecutive recorded data, and the delta value indicates a number of consecutive records that follow the first recorded data.

Next, the procedure of how the recorded data is searched is explained for the embodiment of FIGS. 5A–5B with reference to the block diagram of FIG. 3. When the user inputs a certain character string (search data), the data retrieval controller 50 searches the search and skip file 164 to check the supplemental data to see whether there is the search data for that characters. For instance, when the user inputs particular characters "CA-11", the navigation system searches the search and skip file 164 and reads the supplemental data therein which will be temporarily stored in the buffer memory 52.

Based on the supplemental data, the navigation system will determine that the remaining count is 6, indicating that there are 6 entries or recorded data that start with "CA-11". The navigation system will first see the offset value which is "100" showing the first location of the recorded data having the search data "CA-11". Thus, the navigation system sends the offset value to the offset generator 54 to access the offset 100 in the name and address file 62 and retrieves the recorded data "SecNameRec 0" therein.

Next, the navigation system utilizes the delta data to find the remaining recorded data. The MSB in the first delta data is 0, indicating that the next target recorded data is not located consecutively with the first one. As shown in the name and address file 62, the next offset value (250) for the next recorded data "SecNameRec 1" is 150 bytes away from the first offset value (100). Because each piece of recorded data takes 10 bytes, this indicates that the second recorded data is 15 records away from the first record. Thus, the value for the first delta is 15 as shown in FIG. 5B. The navigation system instructs the offset generator 54 to produce the offset data 250 and retrieves the recorded data "SecNameRec 1" from the name and address file 62.

Next, the second delta data indicates that MSB is 1, which means that there are recorded data consecutively positioned. The value "2" indicates that there are two more consecutively recorded data. As shown in the name and address file 62, after the recorded data "SecNameRec 1" located at the offset 250, there are two more recorded data "SecNameRec 2" and "SecNameRec 3" that are consecutively located. Thus, the second delta data "2" also represents that the offset values for the recorded data "SecNameRec 2" and "SecNameRec 3" are 260 and 270, respectively, even though separate data are not provided for each recorded data to indicate the location thereof. Thus, the navigation system instructs the offset generator to produce the offset data 260 and 270 and retrieves the recorded data "SecNameRec 2" and "SecNameRec 3" from the name and address file 62.

In the third delta data, MSB is 0 which indicates that there is no recorded data located consecutively with the previous data, and that the value 33 indicates that the next data is 33 records away from the previous location (offset value 270) of the recorded data. Thus, the offset generator 54 jumps the offset value to "600" so that the navigation system retrieves the recorded data "SecNameRec 4". The last delta data indicates that there is one consecutive record, thus, the navigation system retrieves the recorded data "SecNameRec 4" at the location "610". In the alternative, the delta data for this recorded data may be represented by MSB 0with the value 1 (jump to the next offset) because the next record is located one record away from the current offset location.

Although there are six locations needed to reach and retrieve the desired recorded data, the navigation system of the present invention needs only four (4) indications of the delta data and one offset value. As noted above and will be described later, each of the delta data in FIG. 5B is configured by two bytes (16 bits) rather than four bytes for each offset value in FIG. 5B. Thus, it is possible to significantly reduce the storage space in the search and skip file 164 in FIG. 5B compared to that of FIG. 4B.

The above process of obtaining the offset values can be also represented by the following: The first offset is 100 as indicated by the offset value in the supplemental data. The second offset value is 250 as calculated from 100+(15×10). The third offset value is 260 as calculated from (250+10).

Similarly, the fourth offset value is 270 as calculated from (260+10). The fifth offset value is 600 which is calculated by 270+(33×10), and the sixth offset value is 610 which is calculated by 600+(1×10).

Figure 6A:
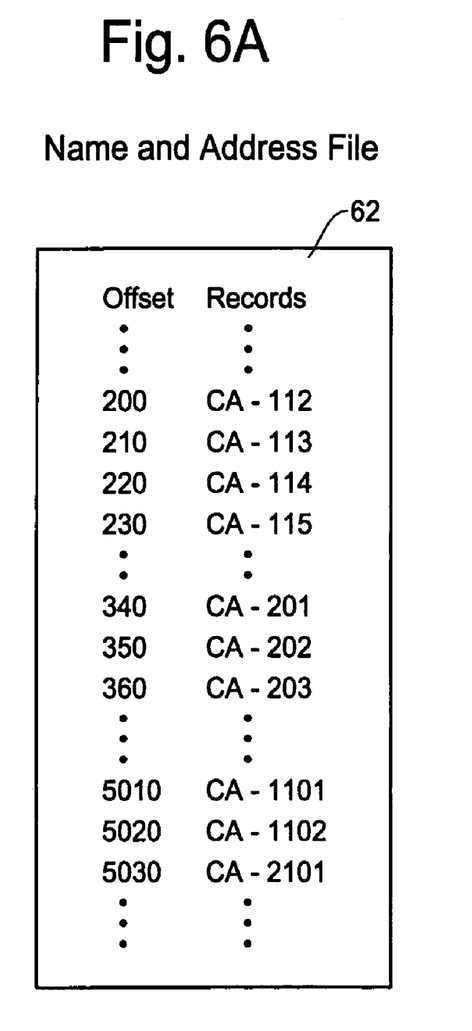
FIG. 6A is the name record file showing offset values and corresponding records.
Figure 6B:
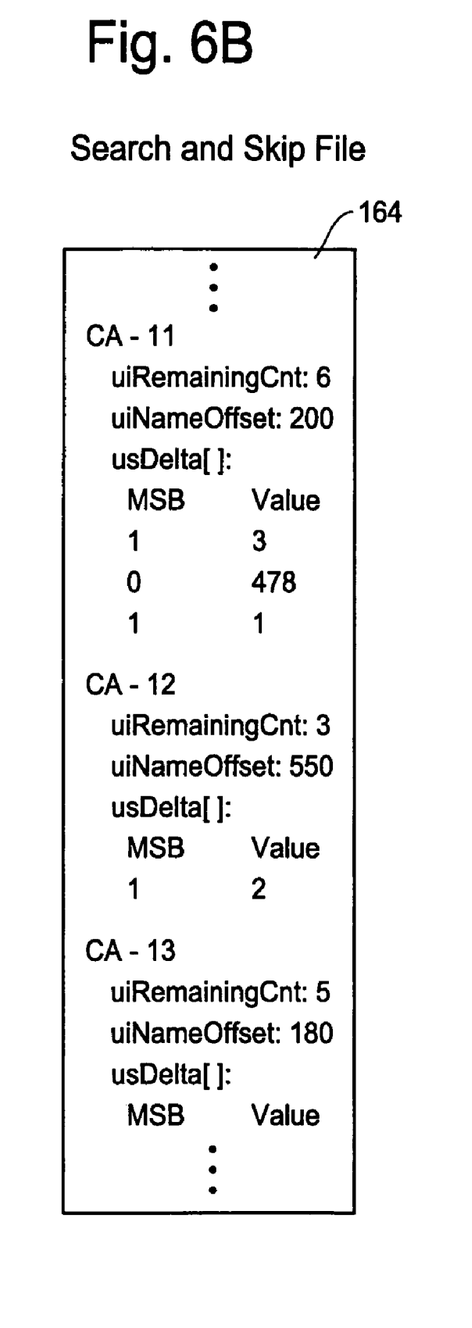
FIG. 6B is the search and skip file showing the number of records to be found and delta data that represent the offset values of the target records.

FIGS. 6A and 6B show a more specific example of the present invention for the situation same as the example of FIGS. 4A and 4B. When the user inputs "CA-11", the navigation system checks to see whether the search and skip file 164 has relevant supplemental data for this character string (search data). Preferably, such supplemental data will be temporarily stored in the buffer memory 52 so that the navigation system (data retrieval controller 50) is able to read the data at high speed.

In this instance, the search and skip file 164 includes the entry (search data) "CA-11" which shows that the remaining count is 6 indicating that there are 6 recorded data in the name and address file 62 that start with the search data "CA-11". The navigation system will check the offset value indicating the location of the first recorded data carrying the search data "CA-11" in the name and address file 62, which is in this case, 200 (first offset value). Thus, the offset generator 54 generates the offset data 200 and the navigation system retrieves the recorded data "CA-12" by going to the address (offset location) 200 in the name and address file 62.

Next, based on the delta data in the search and skip file 164, the navigation system finds and retrieves the remaining recorded data. The MSB in the first delta data is 1, indicating that there are recorded data that follow consecutively with that located at the offset 200. The value 3 of the delta data indicates that there are three consecutively recorded data. As shown in FIG. 6A, such recorded data are "CA-113", "CA-114" and "CA-115" which consecutively follow the recorded data "CA-112". The offset generator 54 generates the offset data 210, 220 and 230 and the navigation system retrieves the recorded data "CA-113", "CA-114" and "CA-115", respectively, from the name and address file 62.

Then, the navigation system reads the next delta data from the search and skip file 164. In this case, the MSB is 0, which indicates that the next recorded data is not consecutive with the previous recorded data. The value 478 indicates the distance from the present offset location, i.e., an amount of address jump, in the name and address file 62. Because each name record takes up 10 bytes, the distance of 478 translates into the offset value of 4,780, i.e, 478 times ten (increment step). Because 230 (previous offset value) added by 4780 is 5010, the next offset location is 5010, where the navigation system retrieves the recorded data "CA-1101".

The navigation system looks at the next delta data, which indicates that the MSB is 1, meaning that there is a consecutive record. The value of 1 indicates that there is only one record that follows from the previous record. In the alternative, the delta data for this recorded data may be represented by MSB 0 with the value 1 (jump to the next offset) because the next record is located one record away from the present offset location. In either representation, the amount of required storage space is the same.

Figure 7:
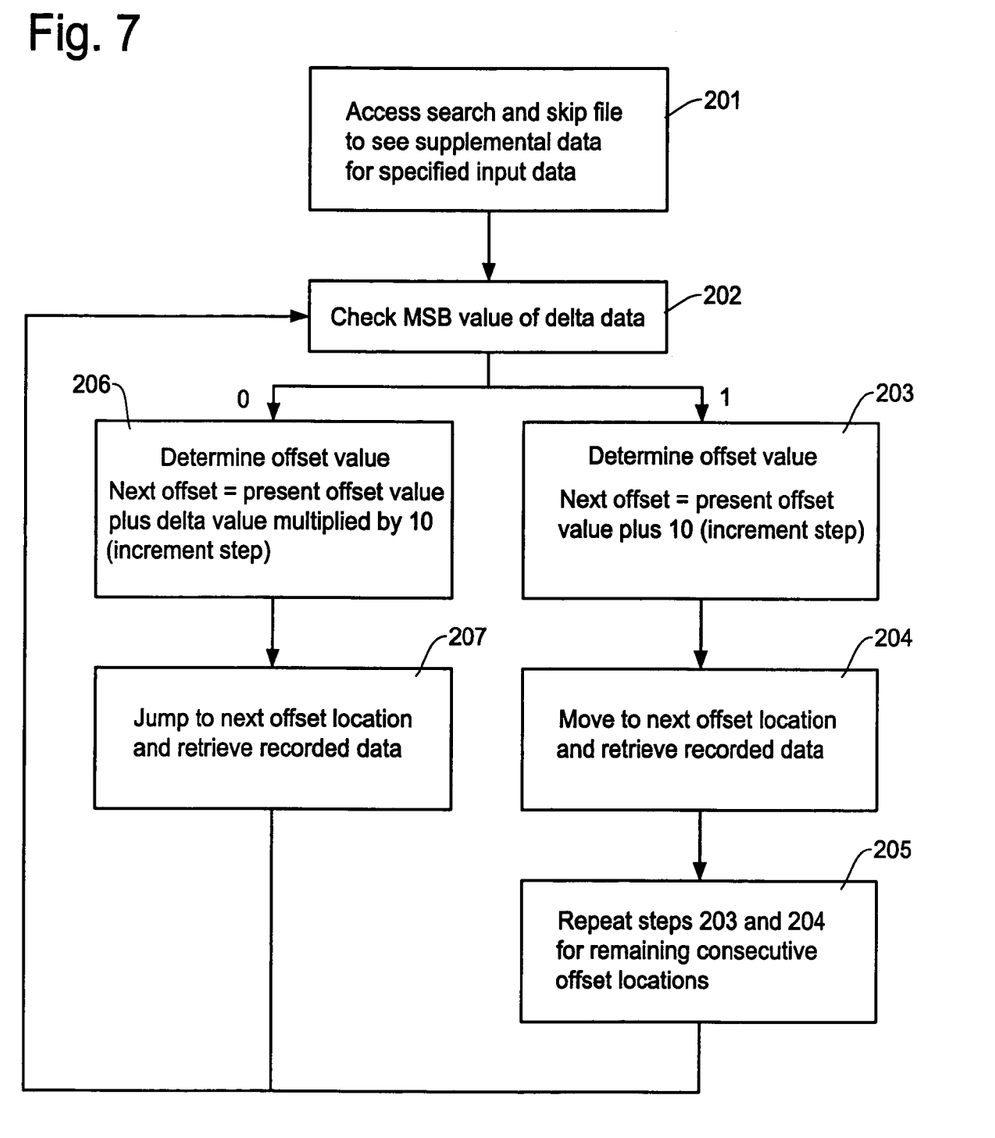
FIG. 7 is a flow chart showing the basic procedure for determining the offset value of each name record using the data representation of the present invention.

FIG. 7 is a flow chart indicating the basic procedure of the present invention to determine the location of the target data in the name and address file 62. This flow chart shows the operation in the embodiment of FIGS. 5A–5B and 6A–6B. In step 201, the navigation system accesses the search and skip file 164 to check supplemental data for the search data specified by the user. When the first offset value is shown in the supplemental data, the navigation system reaches the initial offset location in the name and address file 62 and retrieves the recorded data.

Then, in step 202, the navigation system checks the MSB of the delta data in the supplemental data. If the MSB is 1, the value of the delta data means the number of consecutive records in the name and address file 62 following the current location. Thus, the navigation system goes to the next location by adding the minimum step of increment of the offset value, which is 10 in the above examples, to the present offset at step 203. The navigation system retrieves the recorded data in that offset location in step 204. This process is repeated for the remaining consecutive offset locations by incrementing the offset (address) of the name and address file 62 in step 205. Then, the navigation system goes back to the step 202 and reads the next delta data and checks the MSB value.

In the step 202, if the MSB value is 0, it indicates that there is no record carrying the search data consecutively with the current location. Thus, the navigation system proceeds to step 206 where the amount of jump to the next offset location will be determined. This determination is made by adding the delta value multiplied by 10 (increment step) to the present offset value. Then, at step 207, the navigation system goes to the next offset location in the name and address file 62 and retrieves the recorded data. The navigation system goes back to the step 202 and reads the next delta data if any. The above process will be repeated until all of the recorded data indicated by the supplemental data are retrieved.

In case there are many consecutive records, the effect of the present invention in reducing the size of the search and skip file becomes more significant. For example, if there are 9 consecutive records, the delta data can simply state that 8 more consecutive name data will follow rather than describing each offset value by four-byte data. Thus, there is no need to separately provide the offset value for each consecutive record.

Moreover, even when the name records are not consecutive, the data in the search and skip file is reduced significantly because the offset value is determined from the last record. In the embodiment of FIGS. 4A and 4B, since the search and skip file stores an offset value for each recorded data starting from an absolute beginning point, the memory size required to store the supplemental data can be very large because the offset value may become very large. In contrast, the distance between the current recorded data and the next recorded data is small, especially when the data are arranged in the alpha-numeric order. Thus, in the case where it is predetermined that the largest distance between the records can be represented within 15 bits, then only 15 bits are required to reproduce the offset value. In the case where the offset value has to be determined from the absolute beginning point, the offset value becomes very large and will require more than 15 bits.

Figure 8A:
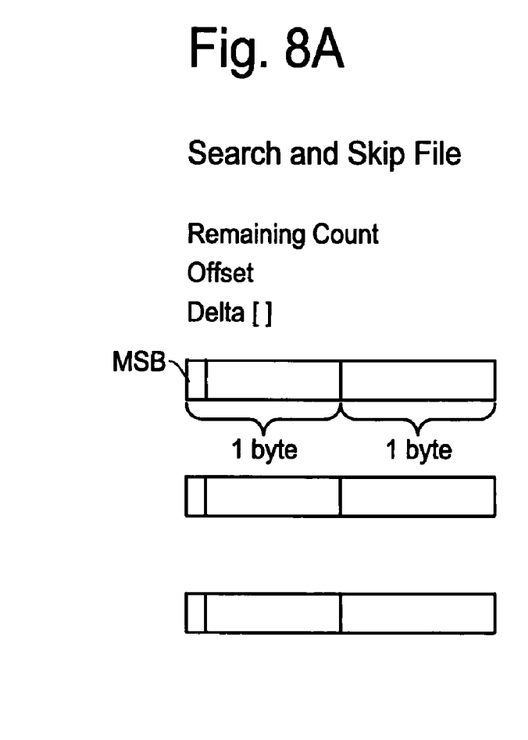
FIG. 8A shows a data configuration in the embodiment of FIGS. 5A–6B and FIG. 8B shows a data configuration in the embodiment of FIGS. 4A–4B.
Figure 8B:
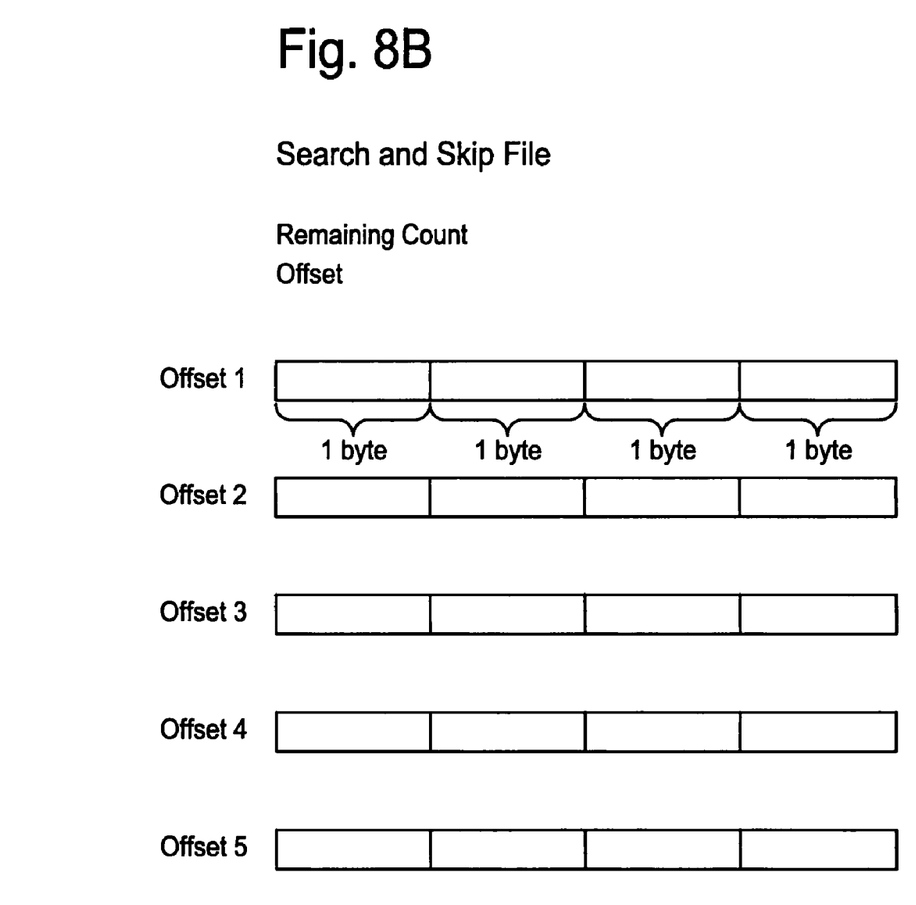

FIGS. 8A and 8B show an example of memory storage structure of the search and skip files in the first and second embodiment of the present invention. In the first embodiment of FIG. 4B, as shown in the example of FIG. 8B, the search and skip file 64 assigns four bytes to describe each offset value for the target recorded data. Because each offset value can be very large such as several ten millions, four bytes may be required to store the offset value.

In the embodiment of FIGS. 5B and 6B, as shown in FIG. 8A, only two bytes are used for the delta data because the offset value is represented based on a relative location. Moreover, because the data representation and retrieval method in the second embodiment can represent many consecutive records by simply stating the number of consecutive records that follow from a particular location, in many cases, it is unnecessary to state each offset value for each recorded data.

Because the search and skip file is prepared in advance, the manufacturer of the database can tell the maximum gap between the related records. In the above example using the input "CA-112", there is a gap of 478 records between "CA-115" and "CA-1101". If the maximum gap in all the recorded data is 6,000, the storage space of the delta data value only needs to be large enough to store 6,000. Thus, since 15 bits can express up to 32,768 different numbers, the structure provided in FIG. 8A in the present embodiment is sufficient to store 6,000 numbers.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A data representation and retrieval method, comprising the following steps of:
providing a primary data file which stores a large volume of recorded data where a location of each piece of recorded data is represented by an offset value;
providing a secondary data file which stores supplemental data for assisting to search and retrieve the recorded data from the primary data file;
receiving a query specified by a user;
accessing the secondary data file to retrieve supplemental data corresponding to the received query; and
accessing the primary data file at locations specified by offset values derived from the retrieved supplemental data and retrieving the recorded data that corresponds to the derived offset values;
wherein said retrieved supplemental data from the secondary data file includes a remaining count indicates the number of recorded data in the primary data file carrying search data corresponds to the received query, an offset value specifies the location of a first recorded data in the primary data file carrying search data corresponds to the received query, and a delta value indicates difference of locations between current recorded data and next recorded data in the primary data file carrying search data corresponds to the received query.

2. A data representation and retrieval method as defined in claim 1, wherein said supplemental data for includes a first offset value showing a first location of the recorded data carrying the search data in the primary data file, and flag data showing whether or not the recorded data carrying the search data are consecutively located in the primary data file.

3. A data representation and retrieval method as defined in claim 1, wherein said recorded data in the primary data file are arranged in an alpha-numeric order.

4. A data representation and retrieval method as defined in claim 1, wherein said search data is a string of alphabetical and numeral characters, and wherein said supplemental data for search data is established in advance in the secondary data file.

5. A data representation and retrieval method as defined in claim 1, wherein said step of accessing the primary data file includes a step of generating offset data based on the retrieved supplemental data from the secondary data file for accessing and retrieving the recorded data from the primary data file.

6. A data representation and retrieval method as defined in claim 2, wherein said flag data further shows a number of consecutive locations when the recorded data carrying the search data are consecutively located in the primary data file.

7. A data representation and retrieval method as defined in claim 5, wherein said step of generating the offset data includes a step of consecutively incrementing the offset data by a minimum incrementing step or jumping a difference of offset values based on the retrieved supplemental data.

8. A data representation and retrieval method as defined in claim 1, wherein each of said offset values is described by four-byte data.

9. A data representation and retrieval method as defined in claim 2, wherein said first offset value is described by four-byte data and said flag data is described by two-byte data, and wherein a most significant bit of the two-byte data shows whether or not the recorded data carrying search data are consecutively located in the primary data file.

10. A data representation and retrieval apparatus, comprising:
a central processing unit;
a data storage contains a primary data file which stores a large volume of recorded data where a location of each piece of recorded data is represented by an offset value, and a secondary data file which stores supplemental data for assisting to search and retrieve the recorded data from the primary data file;
means for receiving a query specified by a user;
means for accessing the secondary data file to retrieve supplemental data corresponding to the received query; and
means for accessing the primary data file at locations specified by offset values derived from the retrieved supplemental data and retrieving the recorded data that corresponds to the derived offset values;
wherein said retrieved supplemental data from the secondary data file includes a remaining count indicates the number of recorded data in the primary data file carrying search data corresponds to the received query, an offset value specifies the location of a first recorded data in the primary data file carrying search data corresponds to the received query, and a delta value indicates difference of locations between current recorded data and next recorded data in the primary data file carrying search data corresponds to the received query.

11. A data representation and retrieval apparatus as defined in claim 10, wherein said supplemental data includes a first offset value showing a first location of the recorded data carrying the search data in the primary data file, and flag data showing whether or not the recorded data carrying the search data are consecutively located in the primary data file.

12. A data representation and retrieval apparatus as defined in claim 10, wherein said recorded data in the primary data file are arranged in an alpha-numeric order.

13. A data representation and retrieval apparatus as defined in claim 10, wherein said search data is a string of alphabetical and numeral characters, and wherein said supplemental data for search data is established in advance in the secondary data file.

14. A data representation and retrieval apparatus as defined in claim 10, wherein said means for accessing the primary data file includes means for generating offset data based on the retrieved supplemental data from the secondary data file for accessing and retrieving the recorded data from the primary data file.

15. A data representation and retrieval apparatus as defined in claim 11, wherein said flag data further shows a number of consecutive locations when the recorded data carrying the search data are consecutively located in the primary data file.

16. A data representation and retrieval apparatus as defined in claim 14, wherein said means for generating the offset data includes means for consecutively incrementing the offset data by a minimum incrementing step or jumping a difference of offset values based on the retrieved supplemental data.

17. A data representation and retrieval apparatus as defined in claim 10, wherein each of said offset values is described by four-byte data.

18. A data representation and retrieval apparatus as defined in claim 11, wherein said first offset value is described by four-byte data and said flag data is described by two-byte data, and wherein a most significant bit of the two-byte data shows whether or not the recorded data carrying the search data are consecutively located in the primary data file.

* * * * *